(No Model.) 7 Sheets—Sheet 1.

R. W. UHLIG.
CASH INDICATOR AND REGISTER.

No. 432,099. Patented July 15, 1890.

Witnesses
John Smire
H. F. Riley

Inventor
Richard W. Uhlig
By his Attorney.
C. A. Snow & Co.

(No Model.) 7 Sheets—Sheet 2.
R. W. UHLIG.
CASH INDICATOR AND REGISTER.

No. 432,099. Patented July 15, 1890.

Witnesses
John Smirie
J. H. Riley

Inventor
Richard W. Uhlig
By his Attorneys
C. A. Snow & Co (No Model.) 7 Sheets—Sheet 3.

R. W. UHLIG.
CASH INDICATOR AND REGISTER.

No. 432,099. Patented July 15, 1890.

Witnesses
John Smillie
H. F. Riley

Inventor
Richard W. Uhlig
By his Attorneys
C. A. Snow & Co.

(No Model.) 7 Sheets—Sheet 5.

R. W. UHLIG.
CASH INDICATOR AND REGISTER.

No. 432,099. Patented July 15, 1890.

Witnesses
John Imirie
H. F. Riley

Inventor
Richard W. Uhlig
By his Attorneys
C. A. Snow & Co.

(No Model.) 7 Sheets—Sheet 6.
R. W. UHLIG.
CASH INDICATOR AND REGISTER.

No. 432,099. Patented July 15, 1890.

Witnesses
Inventor
Richard W. Uhlig
By his Attorneys (No Model.) 7 Sheets—Sheet 7.
R. W. UHLIG.
CASH INDICATOR AND REGISTER.

No. 432,099. Patented July 15, 1890.

Witnesses
M. Fowler
H. F. Riley

Inventor
Richard W. Uhlig
By his Attorneys,
C. A. Snow & Co.

UNITED STATES PATENT OFFICE.

RICHARD W. UHLIG, OF COLLEGE POINT, NEW YORK, ASSIGNOR TO THE UHLIG CASH REGISTER COMPANY, OF JERSEY CITY, NEW JERSEY.

CASH INDICATOR AND REGISTER.

SPECIFICATION forming part of Letters Patent No. 432,099, dated July 15, 1890.

Application filed December 12, 1889. Serial No. 333,476. (No model.)

*To all whom it may concern:*

Be it known that I, RICHARD W. UHLIG, a citizen of the United States, residing at College Point, in the county of Queens and State of New York, have invented a new and useful Cash Indicator and Register, of which the following is a specification.

The invention relates to cash indicators and registers.

The object of the present invention is to provide a cash register and indicator adapted to display the amount of each individual purchase, which amount will remain displayed until the cash-drawer has been opened and closed and opened again, and which will display the total amount of the purchases and enable that amount to be readily ascertained without additional calculations on the part of the operator; and, furthermore, the object of the present invention is to provide a cash register and indicator which will prevent the dials, after they have been rotated and turned to 0, being again rotated until the drawer is in its normal position and the registering mechanism is adapted to register the amount.

A further object of the invention is to prevent the drawer being partially opened and returned without operating the mechanism for bringing the register to its normal condition.

The invention consists in the construction and novel combination and arrangement of parts hereinafter fully described, illustrated in the accompanying drawings, and pointed out in the claims hereto appended.

In the accompanying drawings, forming part of this specification, in which like numerals of reference indicate corresponding parts, Fig. 8 is a detail view of a registering-disk and one of the movable frames.

Figures 1, 3, 11:
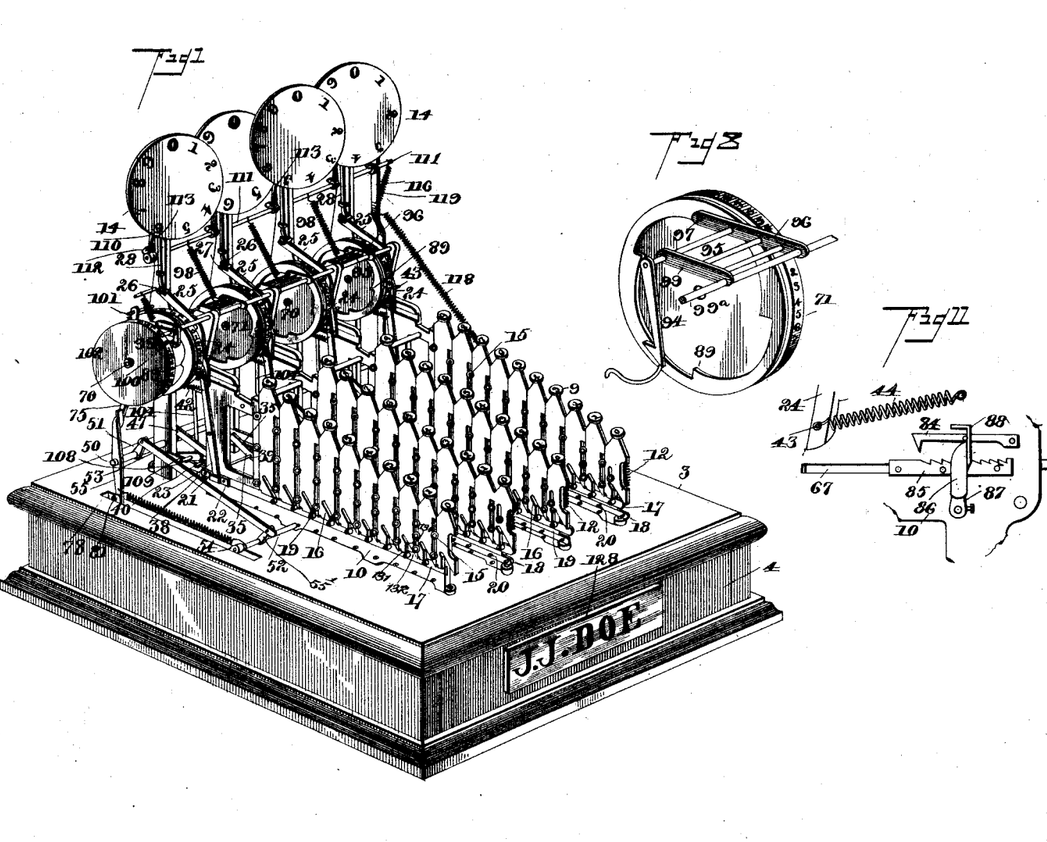
Figure 1 is a perspective view of the cash-register, the top or casing being removed.
Fig. 3 is a side elevation.
Fig. 11 is a detail view of the mechanism for locking the keys until the drawer is entirely closed.
Figure 2:
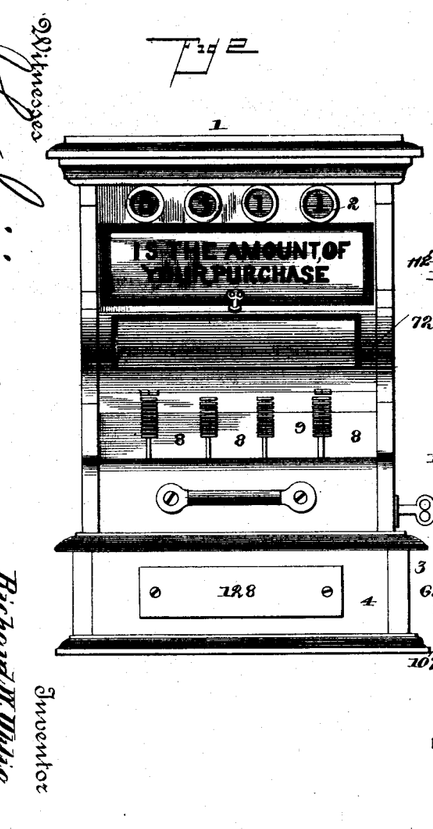
Fig. 2 is a front elevation, the top or casing being in position.
Figure 3:
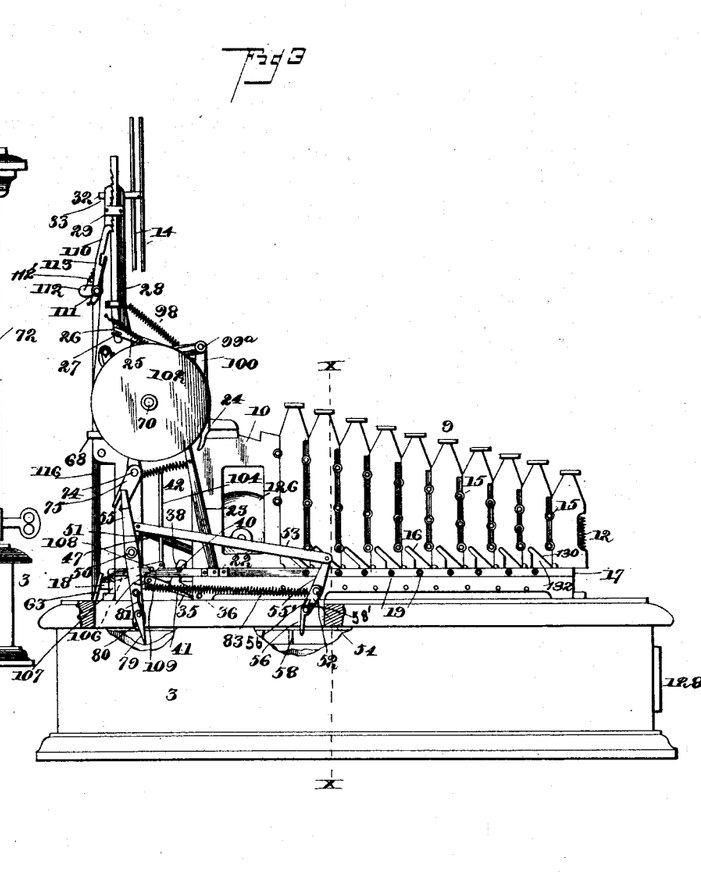
Figure 4:
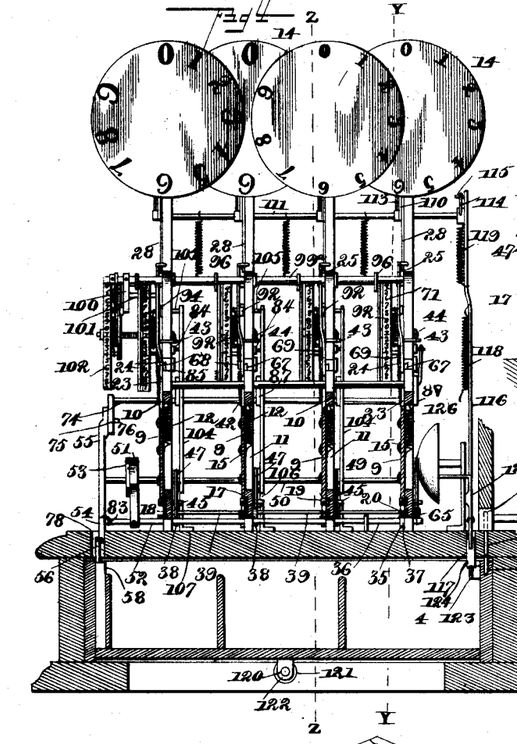
Fig. 4 is a transverse sectional view on the line $x$ $x$ of Fig. 3.
Figure 5:
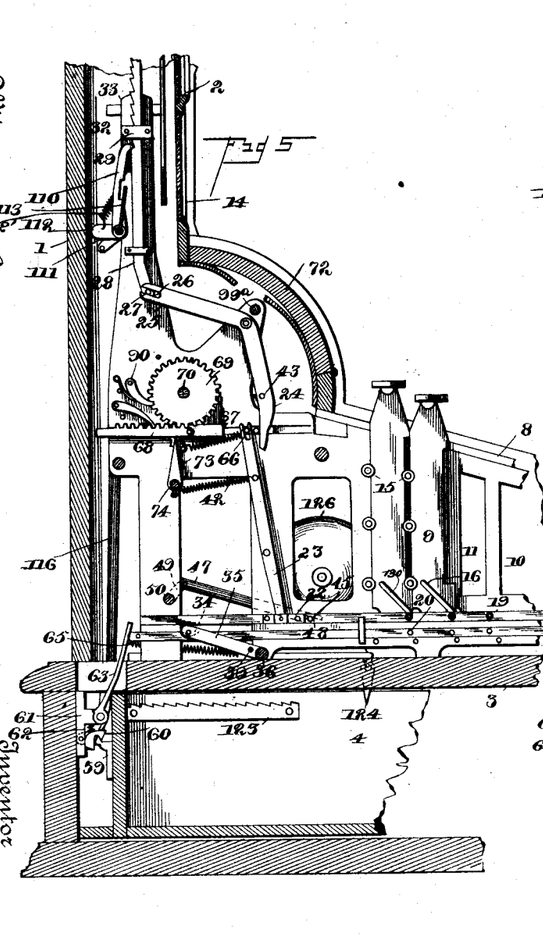
Fig. 5 is a vertical longitudinal sectional view on the line $y$ $y$ of Fig. 4.
Figure 6:
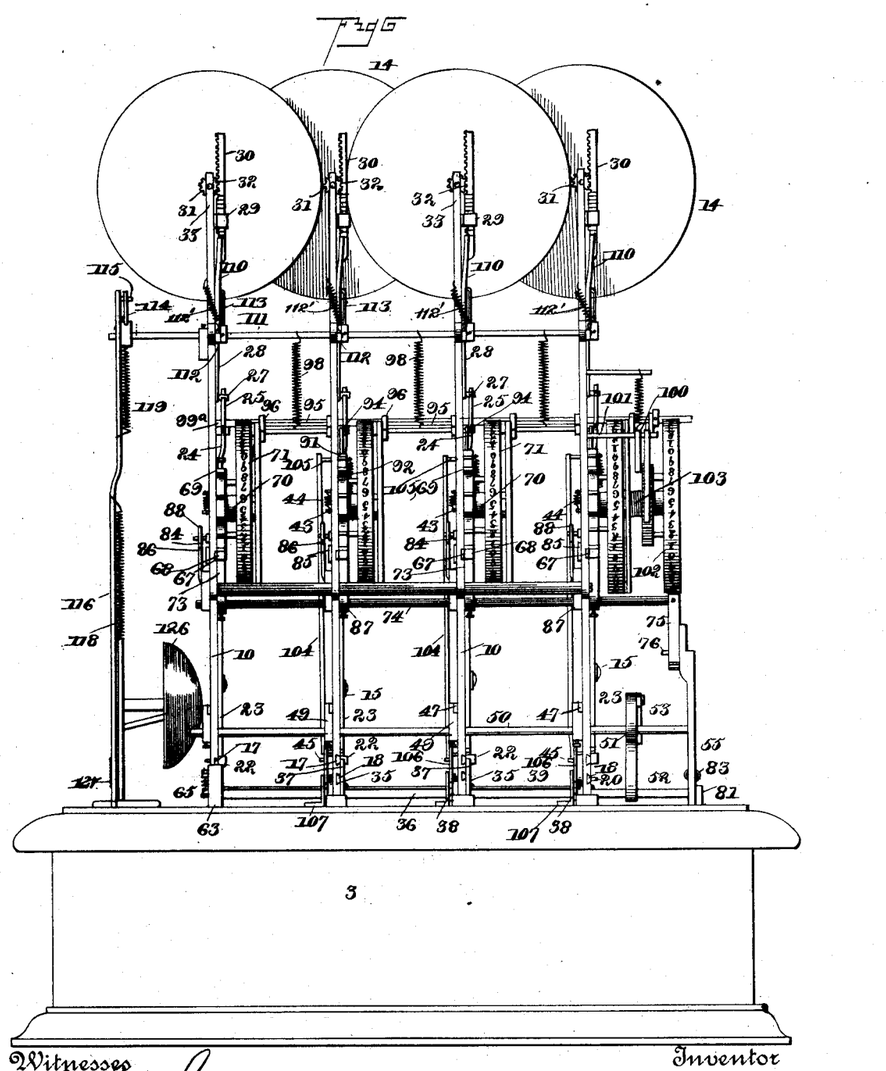
Fig. 6 is a rear elevation.
Figure 7:
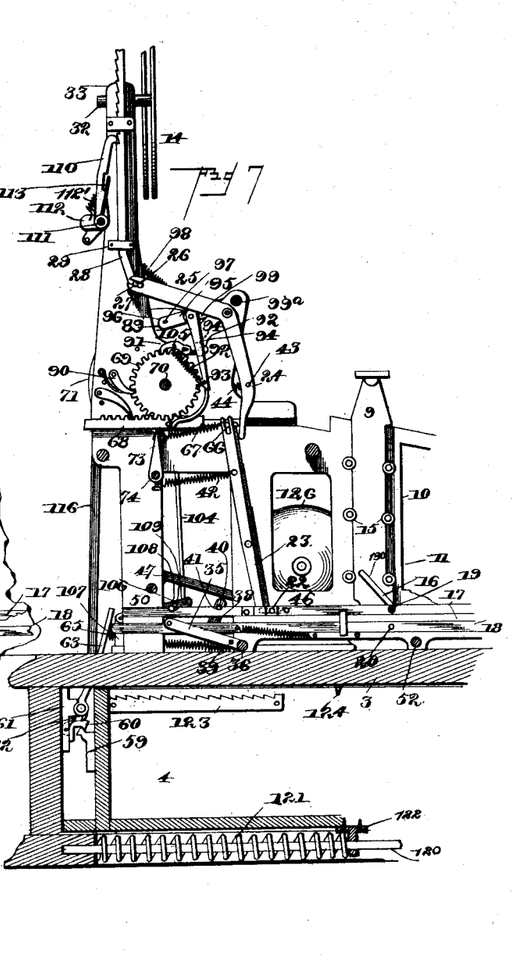
Fig. 7 is a vertical longitudinal sectional view taken on the line $z$ $z$ of Fig. 4.
Figure 9:
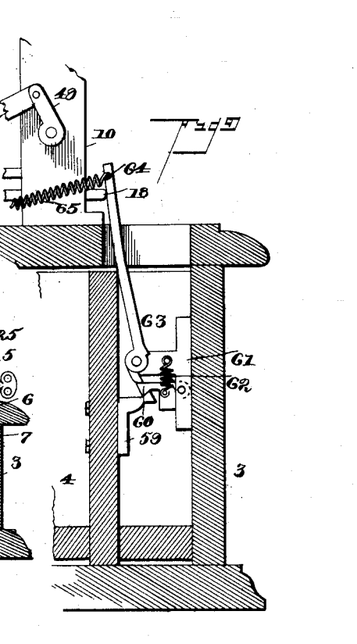
Fig. 9 is a detail sectional view showing the mechanism for locking the drawer.
Figure 10:
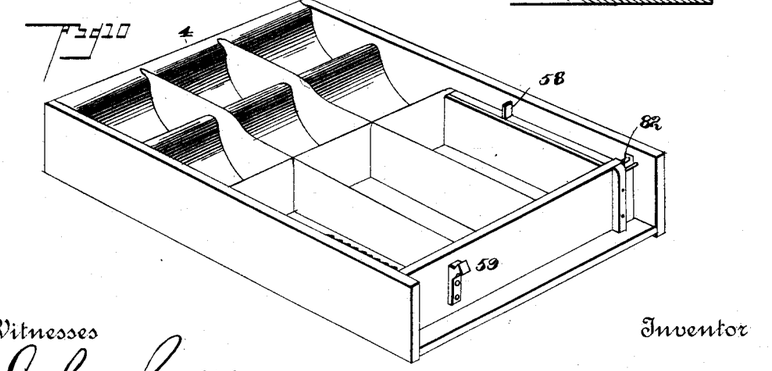
Fig. 10 is a detail view of the drawer.
Figures 12, 13:
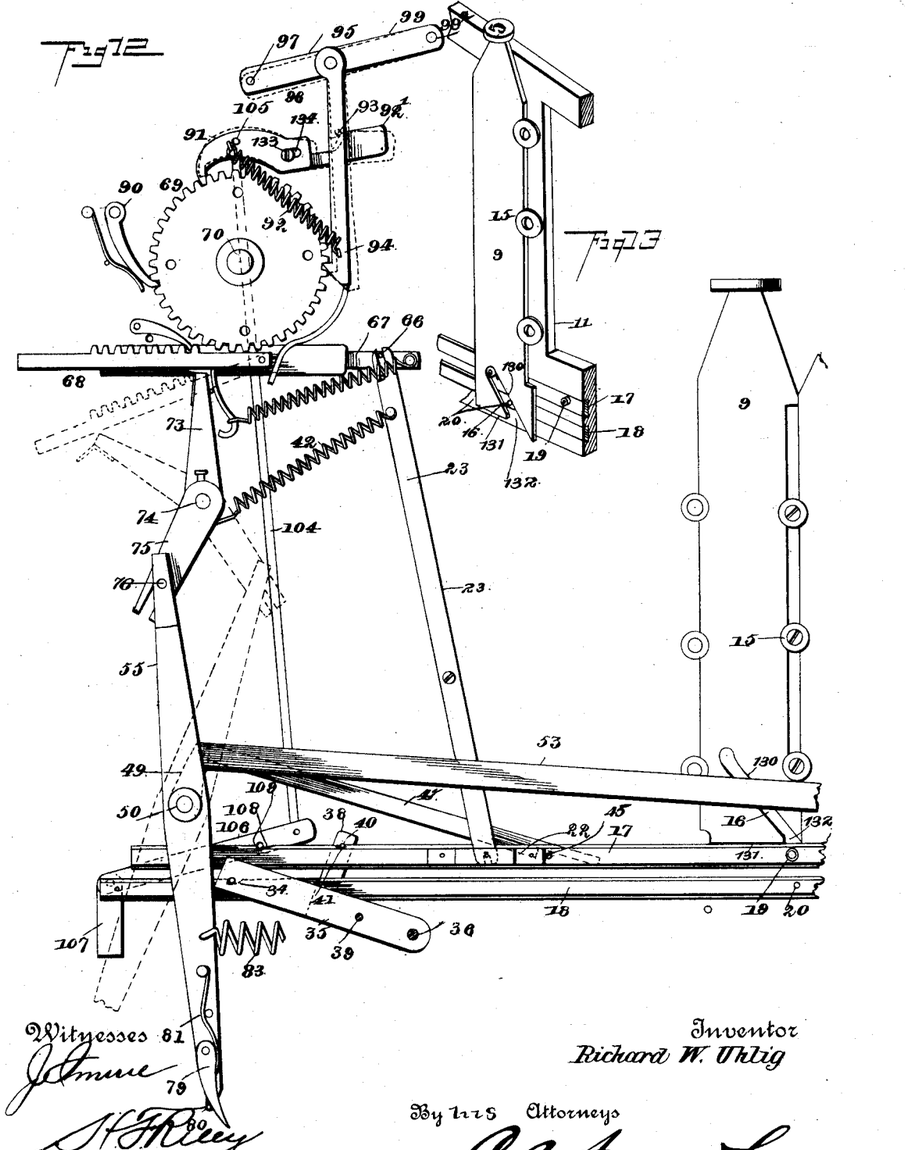
Fig. 12 is a detail view of a part of one of the operating mechanisms of one of the registering-disks and one of the keys removed from the frame, and showing in dotted lines the position of the parts when the drawer is being closed.
Fig. 13 is a detail view showing one of the keys depressed.
Figures 14, 15:
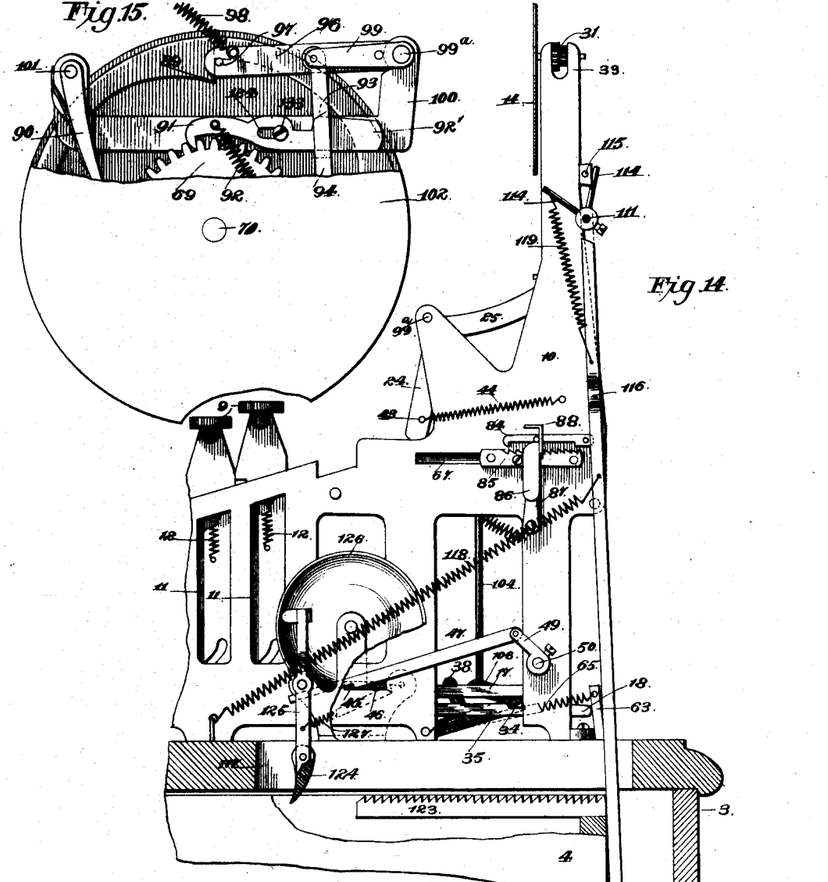
Figs. 14, 15, and 16 are detail views.
Figure 16:
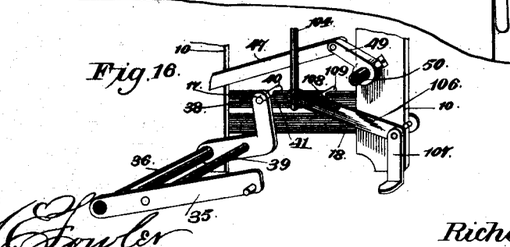

In the drawings, 1 indicates the top of the case in which the different parts and machinery are arranged, and the top or cover which incloses the principal part of the mechanism is removable and is provided near its top with a series of circular apertures 2, to which the figures are exposed that indicate the amount of a purchase, and near these circular apertures is arranged a panel, which is preferably a glass plate and is designed to bear the words "Is the amount of your purchase," or some other similar expression. The top 1 of the casing conforms to the configuration of the mechanism and is suitably secured upon a rectangular lower portion 3, in which is arranged the cash-drawer 4, and the top 1 is provided at a suitable point with a lock 5, whose bolt 6 is elongated and is adapted when extended to engage a recess 7 in the edge of the drawer 4 to lock the latter within the casing. The top 1 has its lower front portion provided with a series of slats 8, which are arranged parallel with each other, and between which are located the series of keys 9. The keys 9 are arranged in series from 0 to 9, and in the accompanying drawings I have illustrated four columns, representing cents, dimes, dollars, and tens of dollars; but they may, if desired, be increased. The keys are constructed of sheet metal and are mounted on a vertical frame 10, which is provided with a series of openings 11, that are arranged at points opposite the keys 9 and contain springs 12, that hold the keys normally elevated and return them to that position after they have been depressed, and the keys are provided at their upper ends with circular heads that have marked upon them the figures that correspond to the numerals upon the indicating-dials 14. The keys 9 slide vertically and are retained against the frame 10 by washers or headed screws 15 or the like, and are provided at their lower ends with inclined slots 16, that engage the longitudinally-sliding bars 17 and 18 and vary in length to vary the distance which the longitudinally-sliding bar 17 moves and to vary the rotation of the dials and enable the different figures to be exposed, and the keys are arranged at different elevations for convenience of operation, and the longitudinally-sliding bar 18 is moved the same distance by all of the keys. The longitudinally-sliding bars are arranged and operate in suitable recesses of the vertical metallic frame 10 and are provided with laterally-extending pins or rollers 19 and 20, those on the sliding bar 17 being preferably provided with sleeves that act as anti-friction rollers and enable the bar to be readily moved by the inclined portion of the keys, and the bar 17 is provided near its rear end with a socket 21, that is preferably formed by a metallic strap 22, secured to the side of the bar and receives the lower end of a lever 23, whose upper end engages an angle-lever 24, whose approximately horizontal arm 25 is provided with a slot 26, that receives a pin 27 on the lower end of a sliding rack 28. The sliding racks 28 are mounted in suitable guides 29, and are provided at their upper ends with a series of teeth 30, that engage pinions 31, that are mounted upon shafts 32, that carry upon their outer ends the figure-dials 14, and when a key is depressed the sliding bar 17 operates the lever 23, which in turn moves the angle-lever 24, whose horizontal arm is depressed, and carries with it the sliding rack 28, that rotates the pinion 31 and the figure-dial 14. The upper ends 33 of the vertical frame 10 are bifurcated and have the shafts 32 mounted in suitable bearings, the pinion 31 being arranged in the opening. The teeth 30, at the upper end of the sliding rack 28, are ten in number, and those of the pinion 31 correspond in number and are just sufficient to rotate the figure-dial 14, and the inclined slot 16 of the key of the first column is sufficiently long to move the sliding rack and the pinion one tooth and expose the figure 1 upon the dial 14 through the aperture 2, and the key bearing the numeral 2 is provided with a slot sufficiently long to move the pinion 31 two teeth and rotate the dial sufficiently far to expose the figure 2 through the opening 2. The inclined slots of the keys gradually increase in length and the mouths of the slots gradually diminish in size; but the inclined edges 130 are the same length in all the keys and the sliding bars are operated by this inclined edge 130, and the intervals between the pins of the sliding bar 17 gradually lessen toward the rear of the frame or the greater numerals to bring the said pins into contact with more of the inclined edge 130, and the pins of the lower sliding bar 18 are set at regular intervals, and all come in contact with the same amount or portion of the inclined edge 130, and the bar 18 is moved the same distance by all the keys. The keys may, if desired, be open below the inclined edge; but it is preferable to employ the construction shown, as when one key is depressed the bar 17 is moved forward and the other pins are carried beneath the lower straight edges 131, which prevent another key of the same row or column being depressed before the parts are returned to their initial position. The bar 17 is not moved until the pins strike the inclined slots or the portion of the inclined edge beyond the openings or mouths or openings 132.

As the construction and operation of the several sets of keys and figure-dials are alike, it will be readily understood that a description of one set will apply to all. It will be seen that no two keys of the same column can be depressed at the same time, and the keys of the various columns have to be depressed successively, and for this purpose the longitudinally-sliding bar 18 is provided with a notch 34, whose bottom wall is inclined and is adapted to raise a gravity-latch 35 to release the sliding bar of the second column of figures corresponding with the sliding bar 17 of the first column of figures or keys, in order that the keys of the second column may be depressed as they are locked in their normal positions until the gravity-latch is raised. The gravity-latch is mounted upon a transverse shaft 36, and consists of an arm or bar 35, provided at its outer or free end with a laterally-extending pin, which, when the keys are elevated in their normal position, rests in the notch 34, and when a key is depressed and the sliding bar 18 is moved backward is raised by the inclined wall of the notch 34 and an angle-arm 38, which is connected to the bar 35 by a rod 39 and is mounted upon the transverse shaft 36, and has at its free end a laterally-extending pin 40, that fits in a notch 41 of the sliding bar 17 of the second set of keys, and prevents the bar being moved and the consequent operation of the second set of keys, thereby necessitating the depression of the keys successively. The vertical lever 23 is retained in its normal position by a spring 42, and the angle-lever 24 is provided with a lateral projection or hook 43, that extends from the vertical arm and has attached to it one end of a spiral spring 44, whose other end is secured to the opposite end of the frame to that on which the angle-lever is arranged, and normally holds the arm vertical and the sliding rack 28 elevated and the figure-dial at 0, and after a key has been depressed and the drawer opened and closed the spiral spring 42, which is attached to the upper end of the vertical lever 23, returns the lever to its normal position and moves the sliding bar 17 forward and raises the key.

Further, to secure the returning of the keys to their elevated position the sliding bars 17 are provided with lateral projections 45, that extend through longitudinal slots 46 in the vertical frames 10, and are engaged by pivoted rods 47, which have their lower free ends provided with shoulders 48 and their upper ends pivotally connected to arms 49 of a rock-shaft 50, which extends transversely across the frame and is provided at one side thereof with an arm 51, that is connected to a similar arm of a transversely-arranged rock-shaft 52 by a bar 53. The rock-shaft 52 has a depending arm 54, that is arranged approximately diametrically opposite the arm 55′, that is connected to the rock-shaft 50, and the said arm 54 has at its lower free end a pivoted pawl 56, that is adapted to engage a projection 58, when the drawer is being closed, to turn the rock-shaft and cause the rods 47 to move forward and return the sliding bars 17 and the keys to their normal positions. The pawl 56 has a toe 56′ arranged back of the projection 58′, and when the drawer is opened the pawl 56 is moved forward, which carries its toe 56′ away from the projection 58′; but when the drawer is being closed the pawl 56 is forced back, which brings its toe into engagement with the projection 58′, and the pawl 56 is made rigid with the arm of the rock-shaft 52, which is thereby turned.

The rear end of the drawer has secured to it an angle-arm 59, that, when the drawer is closed, engages a pawl 60, that is loosely mounted in a bracket 61, and its tooth is capable of a limited vertical movement and is normally held elevated by a spiral spring 62, that has one end attached to the side of the pawl and its other end secured to the bracket. When the drawer closes, the angle-arm 59 engages the lower portion of the pawl, lowers the tooth, and carries the same into engagement with the upper edge of the angle-arm and securely locks the drawer, the pawl being held in that position by the lower end of a lever 63, that is mounted in an arm of the bracket 61 and has its upper end provided with a projection 64, that normally holds the upper end of the lever 63 against the rear end of the sliding bar 18 of the first column or set of keys by means of a spiral spring 65, that has one end secured to the frame 10 and the other end attached to the projection 64, thereby making it absolutely necessary in order to open the drawer to depress one of the keys of the first column of figures, which depression causes the sliding bar 18 to move the lever and carry its lower end out of engagement with the pawl 60. The upper end of the lever 23 is bifurcated and engages a pin 66 of a slide 67, that operates in a recess in the upper portion of the frame 10. The slide 67 has pivotally connected to it a drop-rack 68, that is provided on its upper face with a series of teeth corresponding with those at the upper end of the sliding racks 28, and the rack-bar is normally held into engagement with a cog-wheel 69, that is mounted upon a suitable shaft 70 and carries with it a registering-disk 71, which has a series of numbers marked upon its periphery and arranged from 0 to 9 to correspond with the keys and the figures of the dials. When a key is depressed, it moves the sliding rack, and it also moves the cog-wheel, and consequently the registering-disk is moved forward. The registering-disk may have any desired number of sets of figures from 0 to 9, and when a wheel or disk has rotated ten numbers the disk of the next denomination is moved forward one number, and so on, and it will thus be seen that the entire amount of sales may be readily ascertained at any time by opening the curved door 72 of the top 1 and examining the disks. The drop-racks 68 are normally held in engagement with the cog-wheel 69 by the arms 73 of a rock-shaft 74, and after the keys have been depressed and the amount registered the rock-shaft will be turned by the closing of the cash-drawer, as will be hereinafter fully described, and the racks 68 will drop out of engagement with the cog-wheel 69 and be returned to their normal position, ready again to actuate the cog-wheel.

The outer end of the rock-shaft 74 has secured to it a depending arm 75, whose free end is bifurcated and engages a laterally-extending pin 76, which is provided at the upper end of a lever 55, that is fulcrumed on the outer end of the rock-shaft 50, and has its lower end extending through a slot 78 of the lower portion of the casing. The lower end of the lever 55 is provided with a pivoted pawl 79, which is normally held in a line with the lever and against a projection 80 by a spring 81, and as the drawer closes the end of the pawl engages the first pin 82, which is arranged transversely at the rear end of the drawer and at one side thereof, and moves the lever 55 sufficiently to carry the arms 73 of the rock-shaft 74 away from the drop-racks 68 to allow the latter to become disengaged from the cog-wheel 69, and to be returned to their normal position by means of the spring 83, and the springs that are attached to the vertical and L-shaped levers before locking-pawls 84 are raised to allow the keys to be again depressed. Should the keys be depressed when the drop-racks are not fully back, the registering-wheel could not move the entire length of the drop-racks to correspond to a movement of the figure-dial, and should a key be depressed when the drop-racks are not in engagement with the cog-wheel the figures on the dial-plate would be exposed in the usual manner; but the cog-wheels could not be rotated, and the amount exhibited by the figure-dial would not be registered. In order to prevent such results the slides 67 are provided upon the opposite sides of the frame with racks 85, that have a series of teeth at their upper edge, and as soon as the drop-racks are lowered out of engagement with the cog-wheels the locking-pawls engage the teeth of the racks 85 and prevent further forward movement of the slides. The locking-pawls 84 are provided with laterally-extending pins that are engaged by extensions 86 of arms 87, similar to the arm 73, and the extensions 86 are provided at their rear edges with wire guards 88, that prevent the pins slipping back off the extension.

The registering-disks 71 are provided with series of cams 89, which, when a disk has moved ten teeth, or from 0 to 9, will operate the mechanism and move the disk of the next higher denomination. The cog-wheel 69 is held against retrograde movement by a spring-actuated pawl 90, and is normally held against forward movement by a pawl 91, that is normally held in engagement with the cog-wheel by a spring 92, and has its outer end 92' arranged to engage a shoulder or projection 93 of a pawl 94, that is pivoted to a movable frame 95, and is adapted to be raised by the outer end 92' of the pawl 91 to carry the cog-wheel forward one tooth when the disk of the next lower denomination has been carried forward ten figures. The pivot 133 of the pawl 91 is arranged in a slot 134 of the pawl 91, and the latter has a longitudinal movement, which is sufficient to allow the cog-wheel to move forward one tooth, the pawl remaining in engagement with the cog-wheel until the latter has stopped, and limiting the movement of the same to one tooth, and not being lifted out of such engagement until the cog-wheel has stopped rotating.

The movable frame is composed of two side bars connected by rods, one side bar 96 being provided with a lateral projection 97, which is held into engagement with the cams 89 by a spring 98, and the other side bar 99 being pivoted to the pawl 94. As soon as the pin 97 reaches the end of one of the cams 89 the spring 98 raises the movable frame 95 and carries the pawl 94 upward with it, thereby rotating the cog-wheel 69 one tooth. The transverse shaft 99ª, upon which the movable frames 95 are mounted, has secured to it one end of a hanger 100, whose other end is attached to a rod 101, projecting laterally from the side of the frame near the rear edge thereof. The hanger 100 supports mechanism similar to that heretofore described to actuate an additional registering-disk 102, which is mounted on the same shaft as the adjacent registering-disk, and is separated therefrom and held in its proper position by a spiral spring 103, which is coiled around the shaft and interposed between the two disks.

All of the registering-disks are provided with actuating devices; and are held against forward motion by the pawl 91 until one of its respective set of keys is depressed, or until the disk of the next lower denomination has passed over ten spaces or figures, and in order to raise the pawl 91 out of engagement with the cog-wheel 69 when a key is depressed the pawl is connected to a vertical rod 104 by a transverse pin or bar 105, and the vertical rod has its lower end pivoted to an arm 106, that is pivotally connected to a bracket 107, and is provided with a lateral projection 108, that normally rests in a notch 109 of the sliding bar 17, and the lower wall of the said notch is inclined, and when the bar 17 of either the second, third, or fourth set of keys is moved forward the lateral projection is raised out of the notch, and the vertical rod 104 lifts the pawl 91 out of engagement with the cog-wheel 69 and permits the latter to move forward.

The figure-disks are designed to remain exposed in the positions caused by the depression of the keys until after the cash-drawer is opened and closed and again opened. In order to accomplish this result, the sliding racks 28 are provided at their lower ends with a series of teeth, which, when the drawer is closed, are engaged by spring-actuated pawls 110, that are mounted upon a transverse shaft 111, and are provided with rearwardly-extending arms 112, whose outer ends are connected to springs 112', that have their other ends secured to the frame 10, whereby the pawls 110 are held into engagement with the rack, and the pawls 110 are loosely mounted on the shaft 111, and are withdrawn from engagement with the teeth at the lower end of the sliding racks 28 against the action of the springs that hold the pawls by arms 113, that are secured rigidly upon the shaft 111 and move therewith. The shaft 111 has secured near its outer end a pair of diverging arms 114, between which a lateral projection 115 of a lever 116 moves to operate the shaft 111, and causes the arms 113, that are rigidly mounted on the shaft, to withdraw the pawls 110 from engagement with the sliding racks 28 and permit the latter to be returned to their normal position. The lower end of the lever 116 extends down through a recess 117 in the lower portion of the casing, and is engaged by the rear of the drawer, whereby when the drawer is open the lever will have its lower end drawn forward by a spring 118, which will cause the lateral projection 115 at the upper end of the lever to engage the rear one of the diverging arms 114 and carry the pawls 110 out of engagement with the sliding rack. The shaft 111 is normally held by a spring 119, that is attached to the front one of the diverging arms and the lever 116, so that the arms that are rigidly attached to it are away from the pawls 110 and do not interfere with their engagement with the sliding racks.

The bottom of the casing is provided with a longitudinal bar 120, which is provided with a spiral spring 121, that is coiled around the rear portion, and is adapted to be compressed by a plate 122, that is secured to the bottom of the drawer and is provided with an opening, through which passes the longitudinal bar 120, and when the drawer is closed the spring 121 is compressed, whereby when the drawer is released from the locking-pawl it will be thrown forward by the spring 121 and partially opened.

In order to prevent the drawer being closed after being partially open before it is fully drawn out and to insure operation of the mechanism, the drawer is provided along the upper edge of one of its sides with the rack 123, which is designed to be engaged by a pivoted pawl 124, that is located at the end of the lever 125, that operates and rings a bell 126. The lever 125 is normally drawn rearward by a spring 127, and when the drawer is opened the rack engages the pawl and moves the lever 125 slightly forward sufficient to allow the teeth of the rack 123 to pass the pawl 124; but the latter acts with a lever 125 and forms a straight brace to prevent the rearward motion of the drawer until fully drawn out and until the last tooth of the rack 123 has passed the pawl 124, which is then released and springs back and rings the bell 126. The drawer can then be returned to its proper position within the casing, and the said drawer is designed to be divided into a series of compartments to receive different denominations of money, and is provided upon its outer face with a glass plate 128, behind which is placed the name of the owner of the register.

The figures of the dials of the cents and dimes are designed to be smaller than those appearing on the dollar-dial and the tens-of-dollars dial, so that the amount of a purchase will be readily apparent to every one.

From the foregoing it will be readily seen that cash registers and indicators constructed in accordance with this invention display the amount of each individual purchase and register the total amount of the sales, and that the figures that indicate the amount of the purchase will remain displayed sufficiently long to enable any one to ascertain what they are, and that it is impossible to rotate the figure-dials without actuating the registering-disks and registering the amount thereon, and that the drawer cannot be opened and closed without returning the mechanism to its normal position.

Having thus described my invention, what I claim, and desire to secure by Letters Patent, is—

1. In a cash-register, the combination of the mechanism for rotating the indicating-dial, the longitudinally-sliding bar 17, provided with pins, and the keys having the inclined edges arranged to engage the pins and move the bar 17 different distances and rotate the indicating-dial a corresponding distance, substantially as described.

2. In a cash-register, the combination, with the mechanism for rotating the indicating-dial, of the longitudinally-sliding bar 17, and the vertically-movable keys provided with inclined slots of different lengths and adapted to engage the said bar and move it various distances, substantially as and for the purpose described.

3. The combination, in a cash-register, of the frame, the longitudinally-sliding bar 17, mounted therein, the vertical lever 23, having its lower end connected to the bar 17, the angle-lever 25, having its horizontal arm connected to the sliding rack and to operate the indicating-dial and its vertical arm arranged to be engaged by the vertical lever, and the vertically-sliding keys adapted to move the sliding bar various distances, substantially as and for the purpose described.

4. In a cash-register, the combination of the frame, the angle-lever 25, having its horizontal arm connected to and operating mechanism for rotating the indicating-dial, the slide 67, provided with a pivoted drop-rack, the registering-disk having the cog-wheel secured rigidly thereto and adapted to be engaged and rotated by the drop-rack, and the vertical lever connected to the slide and operated by the keys and arranged to engage the vertical arm of the angle-lever, substantially as described.

5. The combination of the frame, the slide 67, mounted upon one side of the frame, the rack 85, secured to and moving with the slide and arranged upon the opposite side of the frame, the bar 17, the vertical lever connected to the slide and the bar 17, and the locking-pawls 84, adapted to engage the rack and to hold the bar 17 stationary, whereby the keys are prevented being depressed while the registering mechanism is being returned to its normal position, substantially as and for the purpose described.

6. The combination of the frame, the slide 67, mounted upon one side of the frame, the rack 85, secured to and moving with the slide and arranged upon the opposite side of the frame, the locking-pawl adapted to engage the rack and prevent the depression of the keys while the registering mechanism is being returned to its normal position, the rock-shaft provided with arms 87, arranged to engage the locking-pawl and lift the same out of engagement with the said rack, and the lever adapted to be engaged by the cash-drawer to operate the rock-shaft, substantially as and for the purpose described.

7. The combination of the frame, the slide mounted upon one side of the frame, the rack 85, secured to and moving with the slide and arranged upon the opposite side of the frame, the locking-pawl adapted to engage the rack, the rock-shaft provided with an arm 87, having an extension 86 provided with a guard 88 and designed to lift the locking-pawl, the lever 55, and the drawer arranged to engage the lever 55, substantially as and for the purpose described.

8. In a cash-register, the combination of the sliding bar 18, the bar 17 of the adjacent set of keys of the next higher denomination, and the gravity-latch arranged to engage the bar 17 and to be lifted out of such engagement by the said bar 18, whereby the keys are required to be operated successively, substantially as and for the purpose described.

9. In a cash-register, the combination of the sliding bar 18, provided with a notch 34, having an inclined wall, the gravity-latch provided with lateral projections, one of said projections normally resting in the said notch 34, and the sliding bar 17 of the adjacent set of keys having a notch to receive the other lateral projection of the gravity-latch, whereby the keys must be operated successively, substantially as and for the purpose described.

10. In a cash-register, the combination of the frame, the cog-wheel 69, mounted on the frame and connected to the registering-disk, the pawl 91, engaging the cog-wheel and preventing it rotating more than one tooth at a time, the rod 104, connected to the pawl 91, and the sliding bar 17, adapted to engage the rod and lift the pawl out of engagement with the cog-wheel, substantially as and for the purpose described.

11. In a cash-register, the combination of the frame, the cog-wheel 69, mounted on the frame, the pawl 91, engaging the cog-wheel, the rod 104, connected with the cog-wheel and having its lower end attached to the pivoted arm 106, provided with a lateral projection 108, and the sliding bar 17, having a notch adapted to receive lateral projection 108, whereby the pawl 91 will be lifted out of engagement with the cog-wheel when the sliding bar 17 is moved by one of the keys, substantially as and for the purpose described.

12. In a cash-register, the combination of the frame, a registering-dial mounted upon the frame and provided with a series of cams, the cog-wheel 69 of the registering-disk of the next higher denomination, the longitudinally-moving pawl 91, engaging the cog-wheel and preventing the same rotating more than one tooth at a time, the pawl 94, and the movable frame connected to the pawl 94 and adapted to be operated by said cams, substantially as and for the purpose described.

13. In a cash-register, the combination of the frame, a registering-disk mounted upon the frame and provided with a series of cams, the cog-wheel 69 of the registering-disk of the next higher denomination, a pawl 91, engaging the cog-wheel, the pawl 94, provided with a shoulder or projection arranged to engage the pawl 91, and the movable frame carrying the pawl and provided with a lateral projection to engage the said cams of the registering-disk, substantially as and for the purpose described.

14. In a cash-register, the combination of the sliding bars 17, the rock-shaft 50, provided with a series of arms 49, the rods 47, pivoted to said arms and having shoulders 48, adapted to engage the sliding bars 17, and the rock-shaft 52, connected to the shaft 50 and provided with a depending arm designed to be operated by the cash-drawer, substantially as described.

15. The combination of the frame, the slide mounted upon one side of the frame, the rack 85, secured to and moving with the slide and arranged upon the opposite side of the frame, the locking-pawl adapted to engage the rack, the rock-shaft provided with an arm 87, arranged to engage the locking-pawl and lift the same out of engagement with the rack, the lever 55, operating the rock-shaft and provided at its lower end with a pivoted pawl 79, and the cash-drawer provided with pins or projections 82, adapted to successively engage the operating-lever 55, whereby the indicating-dials will be returned to their proper position before the keys can be again depressed, substantially as and for the purpose described.

16. In a cash-register, the combination, with the cash-drawer provided at its back with an L-shaped projection 59, of the spring-actuated pawl 60, adapted to engage the L-shaped projection 59 and lock the drawer, the lever 63, arranged above the locking-pawl 60 and capable of holding the same in engagement with the L-shaped projection, and the sliding bar 18, operating the lever 63 and releasing the locking-pawl 60 and allowing the cash-drawer to be open, substantially as described.

17. In a cash-register, the combination of the frame, the sliding racks mounted upon the frame, the spring-actuated pawls 110, the rock-shaft 111, provided with arms arranged to engage pawls 110 and release the sliding racks, and the lever 116, operated by the drawer and adapted to rotate the rock-shaft 111, substantially as and for the purpose described.

18. In a cash-register, the combination of the frame, the sliding racks mounted upon the frame, the spring-actuated pawls 110, the rock-shaft 111, provided with arms arranged to engage the pawls 110 and release the sliding racks, the diverging arms secured to the outer end of the rock-shaft, and the lever 116, fulcrumed on the rock-shaft and provided with a lateral projection arranged between the diverging arms, substantially as and for the purpose described.

19. In a cash-register, the combination, with a drawer provided at one of its sides with a rack 123, of the lever 125, connected with the bell-sounding mechanism, and provided at its lower end with a pivoted pawl adapted to engage the rack 123 and prevent the return of the drawer until the latter has been completely open, thereby insuring the operation of the cash-register mechanism, substantially as described.

20. In a cash-register, the combination of the frame, the vertically-movable keys mounted on the frame provided with inclined slots of different lengths, the sliding bar 17, having lateral projections and adapted to be engaged by the keys and moved various distances to operate the registering and indicating mechanism of the cash-register, and the sliding bar 18, provided with lateral projections and adapted to be moved the same distance by all the keys to release the gravity-latch and allow the keys of the next adjacent set or column to be depressed, substantially as and for the purpose described.

In testimony that I claim the foregoing as my own I have hereto affixed my signature in presence of two witnesses.

RICHARD W. UHLIG.

Witnesses:
MICHAEL DELANEY,
GEO. C. SMITH.